United States Patent Office 3,117,229
Patented Jan. 7, 1964

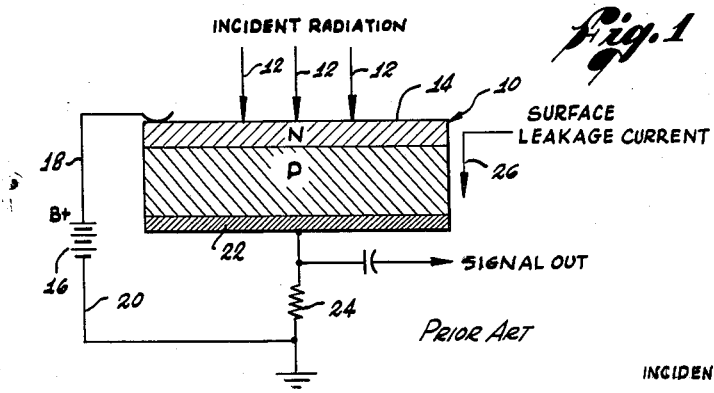
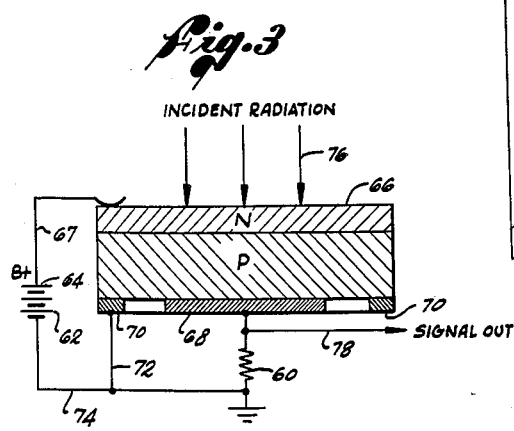
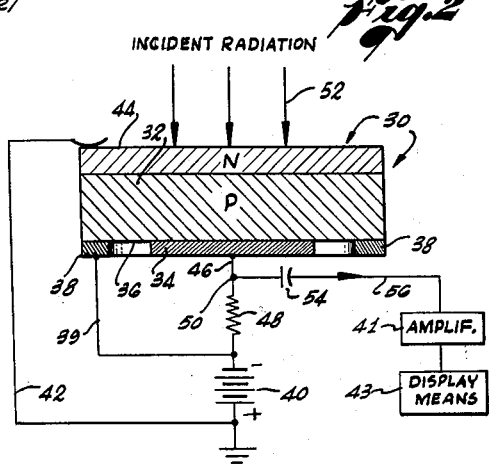
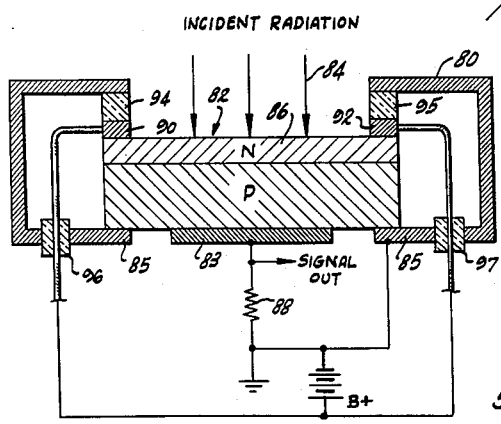
INVENTOR.
STEPHEN S. FRIEDLAND

3,117,229
SOLID STATE RADIATION DETECTOR WITH SEPARATE OHMIC CONTACTS TO REDUCE LEAKAGE CURRENT
Stephen S. Friedland, Sherman Oaks, Calif., assignor to Solid State Radiations, Inc., a corporation of California
Filed Oct. 3, 1960, Ser. No. 60,205
6 Claims. (Cl. 250—83.3)

This invention relates to radiation detection by means of semiconductor materials and relates especially to improvements in semiconductor devices of the PN junction-type in charged particles detection and radiation detection generally.

The detection of nuclear radiation can be obtained in any of the many well known ways, probably the most common being known as the gas ionization chamber. However, systems of such known types have at least several disadvantages, including the disadvantages of the relatively large size of equipment, inaccuracy, background noise, and complexity. In order to avoid many of these problems, semiconductor crystal radiation detectors have recently been used. For example, semiconductor crystals having various types of single PN junctions have been successfully employed as a radiation detector for measurement of radiation generally, and for alpha particle radiation in particular. Such semiconductor counters, while initially only being usable at low temperatures, are now usable at room temperatures. Semiconductor radiation detectors have sharply improved signal-to-noise ratio characteristics as well as other advantages. One of many papers in which the advantages of various PN crystal semiconductors, as particle counters and as a photodiode, are set forth in an article entitled "Characteristics and Operative Mechanism of Germanium NP Alpha Counters" (30), A. V. Airopetiants and S. N. Ryvkin, Zh. Tekh. Fiz., USSR, 27, 11 (1955); English trans. Sov. Phys. Tech. Phys., 2, 79 (1958), pp. 79–88.

Theoretically, it is well established that as a charged particle passes through a seciconductor device, electron-hole pairs are produced which are proportionate in number to the energy loss by the charged particle in its passage through the semiconductor. It is known that by establishing a reverse-biased PN junction in the semiconductor with a depletion region extending over substantially the entire path of the incident particle, the respective electrons or holes so formed are separated and swept by the bias field from the depletion region to produce a current of pulse proportional to the energy lost in the region. These current pulses may then be counted to establish the number of incident particles received and their current measured to determine the incident velocity, or energy of the particles.

Generally, any charged particle will produce ionization or electron-hole pairs as it passes through the crystal. Pulses will be produced in proportion to the incident energy of the particle, provided the energy is substantially all released within the depletion region as noted previously. In the case of neutrons, or light (photons), or other uncharged particles or radiations, it is necessary to transfer the incident energy of these radiations or particles to charged particles as these uncharged radiations or particles pass through the crystal—to produce the detectable effect. Thus, for the detection of neutrons, a crystal has been provided, in the past, with the material to which the incident neutrons may transfer its kinetic energy to provide a detectable charged particle.

It is known that radiation detectors will discriminate the incident particle energies of a wide variety of radiation events and with appropriate circuitry can be made to produce a display of the information relative to such energies and radiation events.

Resolution of pulses of current according to their amplitude, in an efficient manner as possible, is highly desirable. However, it has been found that high resolution of the energy and measurement of charged particles is limited to a great extent, by leakage currents in the semiconductor device of the PN junction type. These leakage currents are due primarily to currents flowing along the surface of the semiconductor material because of the potential required to energize the device, particularly across the N to P junction thereof. There is a secondary but smaller source of leakage current, and this secondary source is the bulk leakage through the volume of the PN junction itself. For example, if the incident radiation surface of a PN junction-type semiconductor is a shallow diffused N-type layer as described in "Tiny Semiconductor Is Fast Linear Detector," by Friedland, Mayer and Williams in Nucleonics, February 1960, volume 18, No. 2, an ohmic contact is made to the entire bottom surface of the P-type material. Contact is made to the N-type surface at one or more points. Leakage currents flowing across the surface of the PN junction then flow into the ohmic lead through a load resistor, as shown in FIGURE 1, which is a showing of the typical prior art, and add to the signal output. When a charged nuclear particle is incident on the detector producing electron-hole pairs within the body of the detector, the minority carrier flowing to the ohmic contact on the P side of the semiconductor device is added to the surface leakage currents passing through the load resistor. For these reasons, high resolution of the energy measurement of charged particles, as well as noncharged particles and electromagnetic radiation, is limited to a large extent.

Bearing in mind the foregoing facts, it is a major object of the present invention to provide a solid state radiation detector which is provided with means for obtaining higher resolution of the energy measurements of incident radiation than has hitherto been obtained.

A further object of the present invention is to provide a solid state radiation detector wherein the surface leakage current bypasses the signal load so that an output signal, which is proportional to the energy of the incident radiation only, is accurately displayed or recorded.

Still another object of the present invention is to provide a method, as well as a means, for obtaining a high resolution of the energy measurement of incident radiation in solid state radiation detectors (or solid state ionization chambers) by eliminating from the output signal resulting from incident radiation on the semi-conductor radiation detector, leakage currents which ordinarily flow across the PN junction surface into the ohmic connection through the load resistor and are thereby displayed in the output signal.

These and other objects of the present invention will become clearly understood by referring to the following description, and to the accompanying drawings, in which:

FIGURE 1 shows, in cross section, a semiconductor device of the prior art in a conventional circuit;

FIGURE 2 shows, in cross section, a schematic representation of the semiconductor device of the present invention together with an appropriate circuit for obtaining an output signal;

FIGURE 3 shows the semiconductor device of my invention in cross section, in a circuit similar to that shown in FIGURE 2 but slightly modified therefrom; and FIGURE 4 shows the semiconductor device of my invention, in cross section, but with a slightly modified circuit arrangement with respect to FIGURES 2 and 3, together with other modifications.

In general, in my invention the ohmic contact or connection on the side of the P type semiconductor remote from the PN junction actually consists of a pair of separate ohmic connections. One ohmic connection is adapted to receive any leakage current passing across the surface of the PN junction, but not to conduct this current through the load resistor to thereby affect the output signal; and the other ohmic connection is adapted to receive the current pulse flowing through the semiconductor junction, in response to incident radiation, and to conduct this current pulse through the load resistor to produce a measurable voltage pulse, the height of which is a direct indication of the particle energy. Suitable amplifiers in the external circuits may be employed to obtain an amplified indication of the particle energy. Since the output signal is not increased or influenced by the surface leakage current, a true indication of the energy measurement of the incident energy is obtained. This is a significant improvement over the radiation detectors of the prior art, which employ a single continuous ohmic connection across the surface of the P-type crystal remote from the PN junction of the semiconductor diode.

For the sake of clarity, a typical prior art semiconductor construction is shown in FIGURE 1 and described. The prior art semiconductor radiation detector comprises a semiconductor diode having a PN junction and an external circuit that is reverse biased with respect to the PN junction. The semiconductor material is designated generally by the numeral 10, and the N-type semiconductor and P-type semiconductor by the letters N and P respectively.

The external circuit comprises a power source such as a battery 16 having conductive leads 18 and 20 connected to the surface 14 of the N-type semiconductor, and to the ohmic connection 22 through a series connected load resistor 24. The battery 16 provides a reverse bias with respect to the PN junction. The ohmic connection 22 contacts the entire external surface of the P-type semiconductor (or simply, P-type surface).

As incident radiation, indicated schematically by the arrows 12, falls onto the N-type surface 14, the current pulse produced across the PN junction, together with the surface leakage current, designated by numeral 26, flowing across the surface of the junction, flows through load resistor 24, and the voltage pulse which results is inaccurate due to the presence of the surface leakage current.

Turning now to FIGURE 2, the radiation detector of my invention is shown generally designated by numeral 30. The semiconductor material 32 has a PN junction. While the PN junction may be formed in any number of ways, it has been found that forming the PN junction whose depletion region extends from within a micron of the N-type surface to at least a depth equal to the penetration range of the incident particle in the semiconductor crystal, is of particular advantage in achieving a high resolution of current pulse due to incident radiation, and I therefore prefer to use such a semiconductor junction. In preparing this junction, a P-type silicon material having a high resistivity, e.g., 1000 ohm-cm. and higher, and a predominant boron impurity, is prepared. An N-type surface region is formed by diffusing phosphorous, an N-type impurity material, into the crystal. A doped N-type region is preferably produced in the crystal, of about 1 micron thickness. The diffusion may be effected by exposure of the crystal surface to a phosphorous-containing gas at an elevated temperature for a sufficient length of time to effect the desired degree of diffusion. The Nucleonics article mentioned previously details the characteristics of such a semiconductor device, and is incorporated herein by reference. It should be emphasized that while the semiconductor formation just described is especially appropriate for use as a radiation detector, the semiconductor employed in our invention can be prepared according to standard practices. See for example Part II of the "Handbook of Semiconductor Electronics," by Hunter, McGraw-Hill, 1st edition, 1956, relating to preparation of semiconductor materials and PN junctions.

Thus, the semiconductor 32 may also include, as N-type materials, germanium crystals with, for example, arsenic, phosphorous, boron, or antimony impurities, and include, as P-type materials, germanium crystals having, for example, aluminum, gallium, or indium impurities. Silicon crystals are also well known semiconductors, and can be used with appropriate impurities, to form the material 32. Also, gallium arsenide, lithium-compensated silicon, and silicon carbide may be used.

A nonperipheral ohmic connection 34 is made to the P-type surface 36 of the body 32, and a peripheral ohmic connection 38 is also made to the P-type surface 36. The ohmic connections 34 and 38 are physically distinct, and spaced from each other at all points. Thus, if the crystal is circular in transverse cross section, the geometrical configuration of the space between the ohmic contacts is that of an annulus. The ohmic connections 34 and 38 are metallic coatings such as solder, vapor-deposited metal coatings, electroplated metal coatings, or the like, although other materials may be used.

The external circuit comprises a power source such as a battery 40 reverse-biased with respect to the PN junction. One conductive connection 42 leads from a surface contact on the N-type surface 44 of the material 32 to the positive side of the battery 40. The other conductive connection 46 leads from the negative side of the battery 40, through a load resistor 48 to the nonperipheral ohmic connection 34. The peripheral ohmic contact 38 is connected directly to the battery side of the load resistor 48.

The load resistor 48 may have a value of 50 ohms to 50 megohms or higher, depending upon the nature of the data circuitry. Since the current across the resistor 48 is small, due to the incident radiation, the two ohmic connections 34 and 38 are at essentially the same potential. Because of this, there is then no opportunity for the surface leakage current to pass from ohmic connection 38 to ohmic connection 34. Further, the surface leakage current flowing into the peripheral ohmic connection 38 cannot, and does not, pass through the load resistor 48. The surface leakage currents flow from the peripheral ohmic contact 38, through conductive lead 39 and thence to the N-side of the semiconductor, and back to the ohmic contact 38. Thus, the leakage currents which flow across the surface of the PN junction will only flow in this wholly conductive circuit which inherently bypasses resistor 48. Since the leakage currents are shunted around the resistor 48, they will not add to or otherwise affect the output signal taken off from point 50 on the high potential side of the load resistor 48. The output signal is sent to an amplifier 41 and thence to a display means 43.

It will be noted that because the P-side and the load resistor 48 are at an elevated potential, determined by the battery 40, the voltage pulse produced in response to incident radiation 52 is preferably capacity coupled out. The capacitor 54 is thus provided in output signal line 56.

It will also be noted that the surface 44 of semiconductor 32 is maintained at ground potential. This is not necessary, but is convenient in many instances as the ground lead can be affixed to a metallic enclosure.

Under many conditions of operation, it is desirable that the load resistor have one side at ground potential. This requires the N-side of the junction to be at an elevated potential, as well as the case of the radiation detector itself. For this arrangement, the external circuitry shown in FIGURE 3 may be utilized.

In FIGURE 3, the load resistor 60 is connected to ground while the power source, battery 62, has its positive terminal 64 connected to the N-type surface of the semiconductor 66 by a conductor 67. The semiconductor 66 and the ohmic contacts 68 and 70 are identical with any of those previously described with reference to FIGURE 2.

The lead 72 from the peripheral ohmic contact 70 is connected to the low potential side of the load resistor 60 and the output signal line is connected to the high potential side of the load resistor 60.

The semiconductor 66, in response to incident radiation 70, will respond with a proportionate current pulse, which passes through load resistor 60 and into the output signal line 78 to indicate a proportionate voltage pulse on a suitable amplifying means (not shown). The peripheral ohmic connection 70 and associated lead 72 prevent leakage currents, traversing the PN junction surface, from passing through the load resistor 60, and adding to the voltage pulse. This is done, as in FIGURE 2, by providing a conductive circuit for the surface leakage currents which shunts, or bypasses, the load resistor 60.

Referring now specifically to FIGURE 4, the radiation detector, i.e., the semiconductor 82 and ohmic connections 83 and 85, are very similar to that of FIGURE 3 both in construction and operation, but with the modification of a grounded electromagnetic shield 80 extending around the detector. The incident radiation 84 still impinges on the exposed N-type surface 86. A thin insulating coat of suitable material, e.g., paper (not shown) may be deposited on the N-type surface 86 to completely shield the radiation detector if beta particles are to be detected.

As in FIGURE 3, the load resistor 88 is at ground potential while the N-type surface is maintained at a higher potential through ohmic contacts 90 and 92. Appropriate insulating material having low leakage, e.g., glass, is interposed at 94, 95, 96 and 97 to prevent short circuiting.

While radiation is shown as being incident upon the N-type semiconductor, it is possible, and sometimes desirable, to radiate upon the P-side surface.

While several embodiments of my invention have been shown and described, it will be apparent that changes and modifications may be made that lie within the scope of my invention. Hence, I do not intend to be limited by the specific embodiments shown and described herein but only by the claims which follow.

I claim:

1. A nuclear particle-radiation detector component, comprising: a semiconductor body consisting of a first layer of one type of semiconductor material having a resistivity of the order of 1000 ohm-centimeters, and a second layer of another type of semiconductor material having an incident radiation surface and forming a PN junction with said first layer at a distance within one micron of said incident surface; a first ohmic contact with the periphery of a surface of said first layer which is generally parallel to said incident surface; and a second ohmic contact with said surface of said first layer but spaced within said first ohmic contact.

2. A nuclear particle-radiation detector, comprising: a semiconductor body including a first layer of one type of semiconductor material having a resistivity of the order of 1000 ohm-centimeters and a second layer of another type of semiconductor material, said second layer having an incident radiation surface and forming a PN junction with said first layer at an extremely close distance from said incident surface; a first ohmic contact with the periphery of a surface of said first layer; a second ohmic contact with said surface of said first layer but spaced within, and away from, said first ohmic contact; a load element having a first end connected to said second ohmic contact; potential means having one end directly connected to said incident surface and another end connected to a second end of said load element, for applying a reverse bias across said PN junction; and a conductive path leading from said first ohmic contact to a point between said potential means and said load element whereby surface leakage current flowing across said PN junction flows through said first ohmic contact to said potential means but not through said second ohmic contact and said load element to said potential means thus altering a voltage output pulse produced as a result of incident radiation.

3. A nuclear particle-radiation detector, comprising: a semiconductor body including a first layer of one type of semiconductor material having a resistivity of at least 100 ohm-centimeters and a second layer of another type of semiconductor material, said second layer having an incident radiation surface and forming a PN junction with said first layer at a distance within one micron of said incident surface; a first ohmic contact with the periphery of a surface of said first layer; a second ohmic contact with said surface of said first layer but spaced within, and away from, said first ohmic contact; a load element having a first end connected to said second ohmic contact; potential means having one end directly connected to said incident surface and another end connected to a second end of said load element, for applying a reverse bias across said PN junction; and a conductive path leading from said first ohmic contact to a point between said potential means and said load element whereby surface leakage current flowing across said PN junction flows through said first ohmic contact to said potential means but not through said second ohmic contact and said load element to said potential means thus altering a voltage output pulse produced as a result of incident radiation.

4. A nuclear particle-radiation detector, comprising: a semiconductor body including a first layer of one type of semiconductor material having a resistivity of the order of 1000 ohm-centimeters and a second layer of another type of semiconductor material, said second layer having an incident radiation surface and forming a PN junction with said first layer at an extremely close distance from said incident surface; a first ohmic contact with the periphery of said incident surface; means for enclosing the sides of said body, one end of said enclosure means forming a second ohmic contact with the periphery of a surface of said first layer; insulating means for joining the other end of said enclosure means to said first ohmic contact; a third ohmic contact with said surface of said first layer but spaced within, and away from, said second ohmic contact, said enclosure means and said third ohmic contact generally shielding said body electromagnetically except for a central area of said incident surface; a load resistor having one end connected to said third ohmic contact and another end connected to said second ohmic contact and ground; potential means having one end connected to said first ohmic contact and another end connected to said ground end of said load resistor, for applying a reverse bias across said PN junction; and a conductive path leading from said second ohmic contact to a point between said potential means and said load resistor whereby surface leakage current flowing across said PN junction flows through said second ohmic contact to said potential means but not through said third ohmic contact and said load resistor to said potential means to alter a voltage output pulse produced as a result of incident radiation.

5. A nuclear particle-radiation detector, comprising: a semiconductor body including a first layer of one type of semiconductor material having a resistivity of at least 100 ohm-centimeters and a second layer of another type of semiconductor material, said second layer having an incident radiation surface and forming a PN junction with said first layer at an extremely close distance from said incident surface; a first ohmic contact with the periphery of said incident surface; means for enclosing the sides of said body, one end of said enclosure means forming a second ohmic contact with the periphery of a surface of said first layer which is generally parallel to said incident surface; insulating means for joining the other end of said enclosure means to said first ohmic contact; a third ohmic contact with said surface of said first layer but spaced within, and away from, said second ohmic contact, said enclosure means and said third ohmic contact generally shielding said body electromagnetically except for a central area of said incident surface; a load element having one end connected to said third ohmic contact and another end connected to said second ohmic contact; potential means having one end connected to said first ohmic contact and another end connected to said second ohmic contact, for applying a reverse bias across said PN junction; and a conductive path leading from said second ohmic contact to a point between said potential means and said load element whereby surface leakage current flowing across said PN junction flows through said second ohmic contact to said potential means but not through said third ohmic contact and said load element to said potential means to alter a voltage output pulse produced as a result of incident radiation.

6. A nuclear particle-radiation detector, comprising: a semiconductor body including a first layer of one type of semiconductor material having a resistivity of the order of 1000 ohm-centimeters and a second layer of another type of semiconductor material, said second layer having an incident radiation surface and forming a PN junction with said first layer at a distance within one micron of said incident surface; a first ohmic contact with the periphery of said incident surface; means for enclosing the sides of said body, one end of said enclosure means forming a second ohmic contact with the periphery of a surface of said first layer which is generally parallel to said incident surface; insulating means for joining the other end of said enclosure means to said first ohmic contact; a third ohmic contact with said surface of said first layer but spaced within, and away from, said second ohmic contact, said enclosure means and said third ohmic contact generally shielding said body electromagnetically except for a central, main area of said incident surface; a load resistor having one end connected to said third ohmic contact and another end connected to said second ohmic contact and ground; potential means having one end connected to said first ohmic contact and another end connected to said ground end of said load resistor, for applying a reverse bias across said PN junction; and a conductive lead from said second ohmic contact to a point between said potential means and said load resistor whereby surface leakage current flowing across said PN junction flows through said second ohmic contact to said potential means but not through said third ohmic contact and said load resistor to said potential means to alter a voltage output pulse produced as a result of incident radiation.

References Cited in the file of this patent
UNITED STATES PATENTS

| 2,672,528 | Shockley | Mar. 16, 1954 |
| 2,885,562 | Marinace et al. | May 5, 1959 |
| 2,988,639 | Welker | June 13, 1961 |
| 2,991,366 | Salzberg | July 4, 1961 |